United States Patent [19]
Austin

[11] Patent Number: 6,062,783
[45] Date of Patent: May 16, 2000

[54] EXPANDING BUSH AND CAPTIVE BOLT ASSEMBLY

[75] Inventor: Stephen Eric Austin, Kenilworth, United Kingdom

[73] Assignee: Jaguar Cars, Limited, Whitley, United Kingdom

[21] Appl. No.: 09/218,492

[22] Filed: Dec. 22, 1998

[30] Foreign Application Priority Data

Dec. 31, 1997 [GB] United Kingdom .................... 9727422

[51] Int. Cl.[7] ..................................................... F16B 13/06
[52] U.S. Cl. ................................ 411/57.1; 411/45; 411/65
[58] Field of Search ................................ 411/45, 46, 57.1,
411/60.1, 60.2, 63, 64, 65, 55, 352, 353, 999

[56] References Cited

U.S. PATENT DOCUMENTS

| | | | |
|---|---|---|---|
| 1,767,019 | 6/1930 | Sergeeff | 411/57.1 |
| 3,221,794 | 12/1965 | Acres | 411/353 |
| 3,603,626 | 9/1971 | Whiteside | 411/57.1 |
| 5,356,252 | 10/1994 | Whistler | 411/55 |

FOREIGN PATENT DOCUMENTS

| | | | |
|---|---|---|---|
| 771368 | 10/1980 | Russian Federation | 411/57.1 |
| 2245326 | 1/1992 | United Kingdom | 411/55 |

*Primary Examiner*—Flemming Saether
*Attorney, Agent, or Firm*—Joseph W. Malleck

[57] ABSTRACT

An expanding bush and captive bolt assembly (1), comprising a bolt (2), a generally cylindrical bush (4), and a ring clip (6) that retains the bush on the bolt. The bush (2) has an inner surface with a portion (22) that has a frustoconical taper, a channel (12) that extends circumferentially inside the bush, and an expansion split or slot (7) so that the bush may be expanded radially. The bolt (2) has a threaded portion (10) for engaging with a socket that has a matching thread, a head (8) by which the bolt may be rotated to tighten the bolt (2) to the socket and to squeeze axially the bush (4), a shaft (18,20,23) between the head (8) and the threaded portion (10), said shaft having a portion (20) with a taper that engages with the tapering portion (22) of the bush to expand the bush (4) as it is squeezed axially between the taper (20) and the socket, and a channel (16) that extends circumferentially around the shaft and which opposes the channel (12) of the bush. The ring clip (6) is seated between the bolt (2) and the bush (4) and is engaged with both channels (12,16) to retain the bush (4) on the bolt (2).

13 Claims, 2 Drawing Sheets

EXPANDING BUSH AND CAPTIVE BOLT ASSEMBLY

TECHNICAL FIELD

The present invention relates to an expanding bush and captive bolt assembly that may be fitted through a bore so that the bush expands to grip the bore, and in particular to an assembly in which the bush may be withdrawn from a bore by the captive bolt.

DISCUSSION OF THE PRIOR ART

A common type of bush and bolt arrangement is one in which the bush is compressively deformed as it expands to grip the bore, the compression being such that the bush remains bound, at least to some degree, to the bore if the bolt is removed. Often this is an advantage, because the bush may be used again with the same or a different bolt. Examples of such bushes may be seen in patent documents U.S. Pat. No. 4,408,937 and GB 1,524,866.

A problem arises, however, if the bush and bolt are used in a situation where the bolt and/or bush may become corroded, for example in the presence of water bearing salt or other contamination. In this case, the bush may become distorted, or may become extremely difficult to remove from the bore, as may be necessary, for example if the nominal location or size of the bolt and bush assembly needs to be altered.

Other problems may arise if the bush remains loose in the bore after withdrawal of the bolt. For example, the bush may inadvertently slip inside the bore and become lost or cause an obstruction.

SUMMARY OF THE INVENTION

It is an object of the present invention to provide a more convenient bush and bolt assembly. According to the invention, there is provided an expanding bush assembly, comprising a bolt, a generally cylindrical bush assembled over the bolt, and a ring clip that retains the bush on the bolt, wherein: the bush has an inner surface with a portion with a frustoconical taper, a channel that extends circumferentially around an inner surface of the bush, and at least one expansion split so that the bush may be expanded radially; the bolt has a threaded portion for engaging with a socket that has a matching thread, a head by which the bolt may be rotated to tighten the bolt to the socket and to squeeze axially the bush, a shaft between the ahead and the threaded portion, said shaft having a portion with a taper that engages with the tapering portion of the bush to expand the bush as the bush is squeezed axially between the taper and the socket, and a channel that extends circumferentially around the shaft and which opposes the channel of the bush; and the ring clip is seated between the bolt and the bush and engaged with both channels to retain the bush on the bolt.

The clip then retains the bush on the bolt, for example as the assembly is inserted through a recess or bore when the bolt is to be tightened to the socket. As the bolt is tightened, the bush will then expand to engage securely with the recess or bore. When the bolt is to be loosened and removed from the socket, the clip again helps to retain the bush on the bolt so that the assembly may be removed as a whole from the recess or bore. In general, the inner surface of the bush may conform to the outer surface of the bolt.

The clip may be a wire with a circular shape extending substantially fully around the arc of the circle. Such a clip will be referred to hereinafter as a "circlip".

Preferably, the channel of the bolt extends continuously around a circumference of the shaft. The clip may then be seated within the channel without regard to the orientation of the clip with respect to the circumference of the bolt channel.

In a preferred embodiment of the invention, the shaft has on one side of the tapering portion a first generally cylindrical portion proximate the head and on the other side of the tapering portion a second generally cylindrical portion proximate the threaded portion. The channel is then provided in one of the cylindrical portions, and most preferably in the cylindrical portion proximate the head.

Because the bush will move axially relative to the bolt as the bush is squeezed axially, it is desirable to allow for some axial movement between the clip and the channels in the bolt and bush. One way in which this movement may be accommodated is to have the channel of the bush wider than the channel of the bolt, so that the clip may move axially in the channel of the bush.

In one embodiment of the invention, the bush is of unitary construction and the expansion split is at least one slot in the bush.

In another embodiment of the invention, the bush is split longitudinally into two or more portions. These portions are then spring biased together by spring biasing means, for example a circlip extending around the outer circumference of the bush. The expansion split can then be provided by the gaps or seams between said portions.

The invention will now be described by way of example, with reference to the accompanying drawings, in which.

DETAILED DESCRIPTION AND BEST MODE

Figure 1:
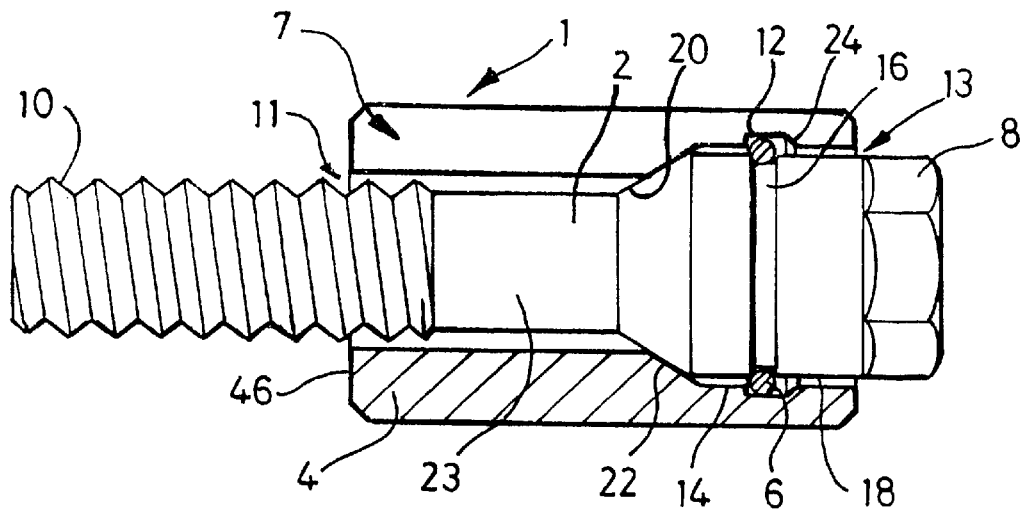
FIG. 1 is a cross-section view of a first embodiment of the expanding bush assembly according to the invention, in which the bush is split with one slot.

FIG. 1 shows an expanding bush assembly 1, having a bolt 2, a generally cylindrical bush 4 assembled over the bolt 2, and a ring clip 6 that retains the bush 4 on the bolt 2. The bolt 2 is made from forged 10.9 grade steel. The bolt 2 has a hexagon head, and is 60 mm long with an M10 thread 10 having a 1.5 mm pitch.

The bush 4 is made from a high tensile strength steel, such as EN8 heat treated steel, and extends from near the head 8 at least as far as part of the threaded portion 10 of the bolt. The bush 4 has two open ends, the narrower of which 11 has a diameter of 10.5 mm, and the wider of which 13 has a diameter of 14 mm. The outer diameter of the bush is 20 mm, with a length of 33 mm.

A 3 mm wide slot 7 extends the full length of the bush 4, allowing the bush to expand when subject to a radially directed outward force within the bush.

The clip 6 is spring biased outwardly into a channel 12 that runs around a full circumference of an inner cylindrical surface 14 of the bush 4. The bolt 2 also has a channel 16 that runs around a full circumference of an outer cylindrical surface 18 of the bolt 2. The base of the channel 16 has a diameter of 13.5 mm. The channels 12, 16 are aligned when a frustoconical tapering surface 20 of the bolt 2 abuts a matching surface 22 of the bush.

The bolt has another cylindrical surface 23 extending from the bolt tapering portion 20 to the start of the thread 10. Taken together, the two cylindrical portions 18,23 and the tapering portion 20 define a shaft of the bolt that extends between the head 8 and thread 10 of the bolt 2.

The clip 6 is a steel wire "circlip" extending nearly around a full circle, so that the radius of the clip may be expanded or contracted. The wire has a round cross-section about 1 mm in diameter.

The channel 12 of the bush has a ramped wall 24 on the side of said channel furthest from the tapering portion 22 of the bush, whilst the opposite wall 26 nearest the bush tapering portion 22 has an essentially square section, so that this wall 26 meets the base of the channel 12 and the adjacent cylindrical surface 18 at right angles.

The bolt 2, bush 4 and clip 6 are assembled as follows. First, the clip 2 is squeezed radially to reduce the diameter of the clip 6 from a natural diameter of about 16 mm to about 13 mm, in order to allow the clip 6 to be inserted into the wider 13 of the bush's open ends. The clip is then pressed along the inner cylindrical surface 18 until the clip 6 snaps outwards into the channel 12 of the bush. The ramped wall 24 helps the clip 6 to engage smoothly with the bush channel 12, whilst the square section wall 26 helps to prevent the clip from being inserted beyond the bush channel 12.

The base of the channel 12 has a diameter of about 14.5 mm, so that the clip 6 remains positively seated within the channel 12 with an outwardly directed spring bias.

The threaded end 10 of the bolt 2 is then inserted into the wider of the bush's open ends 13. The diameter of the bolt cylindrical surface 18 is such that there is clearance with the bush cylindrical surface 14, but not with the clip 6 seated in the bush channel 12. The bolt may therefore be freely inserted until the bolt tapering portion 20 comes into contact with the clip 6. The bolt 2 may then be fully inserted by pressing the bolt with sufficient force so that the clip rides over the bolt tapering portion 20 onto the bolt cylindrical surface 18, so causing the bush 4 to expand radially in the process. As this is happening, the square edge of the bush channel 12 retains the clip 6 within the bush channel 12. As the bolt 2 is fully inserted, the clip 6 snaps into engagement with the bolt channel 16. The arrangement is such that the bush 4 cannot contract to a fully relaxed diameter, but retains a slight inwardly compressive bias, thereby pressing the clip 6 into engagement with the bolt channel 16.

Figure 2:
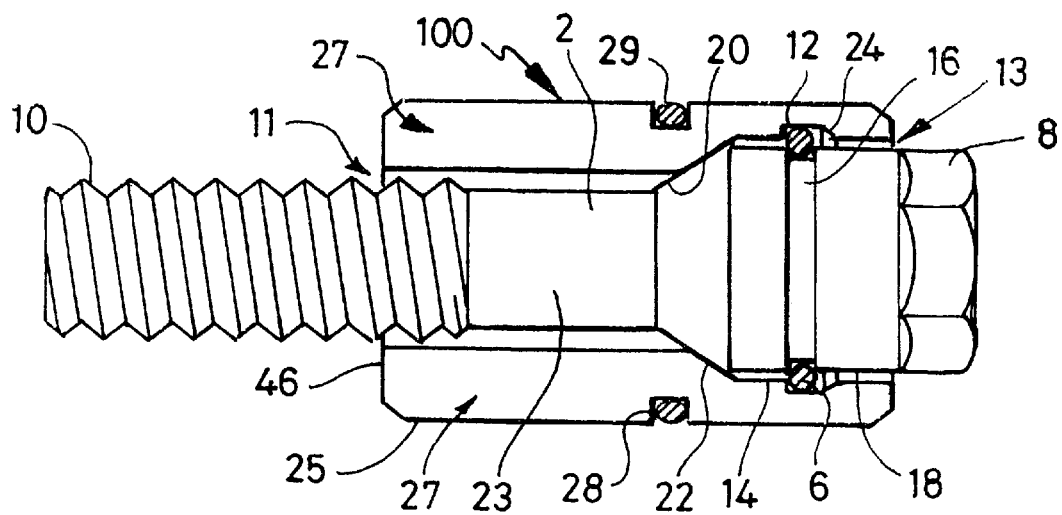
FIG. 2 is a cross-section view of a second embodiment of the expanding bush assembly according to the invention, in which the bush is split in two halves.

FIG. 2 shows another expanding bush assembly 100, which is the same as FIG. 1 except that this has a bush 25, split longitudinally into two similar halves, one of which is visible in the drawing. The two halves come together along two similar and coplanar splits or seams 27, and are spring biased together by a steel wire circlip 29 seated in a circumferential groove 28 of square cross-section in the outer circumference of the bush halves 25. The outer groove 28 is near the mid-point along the length of the bush 25, so that this compresses the bush evenly along its length.

The assembly 100 is put together in a similar manner to that described above, except that the two halves forming the bush 25 are first assembled with the outer circlip 28. In use, one or both of the seams 27 will then open up when the bolt 2 is inserted into the bush 25, with the spring bias from the outer circlip 28 then keeping the pair of matching tapering surfaces 20,22 together. Although this involves an additional process step in assembly of the unit, it can be less expensive to manufacture two similar halves rather than form a slot 7, for example by cutting, in a unitary bush.

Figure 3:
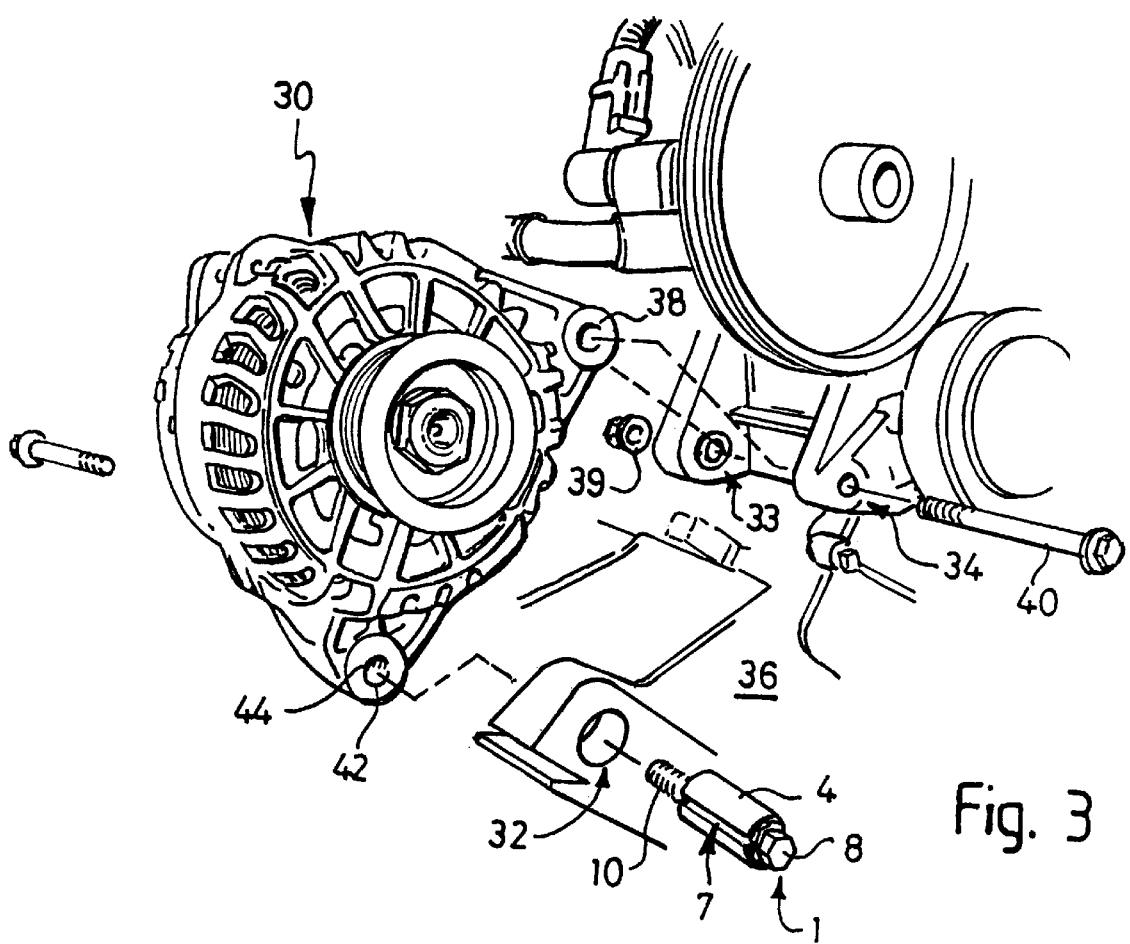
FIG. 3 is a view of the interior of a motor vehicle engine compartment, showing how the expanding bush assembly of FIG. 1 may be used to help mount an alternator to an engine.

Either of the expanding bush assemblies 1 or 100 may then be used to connect components together. FIG. 3 shows one such use of the assembly 1 in a motor vehicle engine compartment, connecting an alternator 30 to three mounting points 32,33,34 on the outside of an oil sump 36. One of the mounting points 32 is a bore with clearance for the assembly bush 4, and the other two mounting points 33,34 are a pair of axially aligned bores to which a nut 39 and bolt 40 may be connected.

The alternator 30 has one bore 38 with clearance for the bolt 40, and another tapped bore, or socket, 42 for receiving the threaded end 10 of the assembly bolt 2. The alternator 30 is first brought up against the outside of the sump 36 so that the clearance bore 38 is aligned between the pair of axially aligned bores 33,34. The nut 39 and bolt 40 may then be connected to hold the alternator 30 loosely in place.

The alternator can then be rotated about the axis defined by the bolt 40 until the socket 42 is in line with the bore 32, the arrangement being such that a surface 44 about the socket 42 abuts an opposing surface about the bore 32. The expanding bush assembly 1 is then inserted through the bore 32, which has sufficient clearance to accommodate the bush 4 given typical manufacturing tolerances between the relative positions for the socket 42, bore 38 and three mounting points 32,33,34.

The assembly bolt thread 10 can then be engaged with the matching thread in the socket 42, during which an end surface 46 of the bush 4 comes into contact with the surface 44 about the socket. The bolt is then tightened to squeeze the bush 4 between the socket surface 44 and the bolt tapering portion 20, thereby causing the bush to expand radially until the bush 4 is tight within the bore 32. The assembly bolt 2 described above may be tightened to a torque of 20 Nm plus 90° turn.

Finally, the nut 39 and bolt 40 are tightened to secure the alternator 30 in place.

The alternator may at some point have to be replaced, in which case the assembly bolt 2 will have to be disengaged from the socket 42. If the alternator has been in place long enough, or in conditions harsh enough, to cause the bush 4 to start to rust or corrode, then the bush may not disengage easily from the bore 32. Once the bolt has started to loosen however, the clip will automatically engage the bolt with the bush and drive the bush out of the bore 32 as the bolt is turned to disengage the threads 10 from the socket 42. The nut 39 and bolt 40 may then be disconnected to release the alternator 30.

If necessary, for example if the relative locations of the socket 42 and bore 38 are slightly different, a new expanding bush assembly may be used to reconnect the new alternator 30 to the sump 36.

The expanding bush assembly is suitable for use in a wide range of applications, particularly those where it may be necessary change the bush, for example owing to corrosion or because of changes of parts' dimensions. The assembly is relatively easy to put together, and once assembled keeps the bush captive on the bolt in situ during and removal of the assembly. During removal, the clip will automatically engage with the aligned channels in the bolt and bush so that the bush may be withdrawn, forcibly if necessary, through the screw action of the bolt.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. An expanding bush assembly (1), comprising: a bolt (2), a generally cylindrical bush (4,25) assembled over the bolt (2), and a ring clip (6) that retains the bush (4,25) on the bolt (2),
   (i) the bush (4,25) having an inner surface with a small portion (22) thereof with a frustoconical taper, a channel (12) located intermediate the ends of the bush and extends circumferentially around an inner surface of the bush (4,25), and at least one expansion split (7,27) so that the bush (4,25) may be expanded radially;
   (ii) the bolt (2) having a threaded portion (10) for engaging with a socket that has a matching thread, a head (8) by which the bolt (2) may be rotated to tighten the bolt (2) to the socket and to squeeze axially the bush (4,25), a shaft (18,20,23) between the head (8) and the threaded portion (10), said shaft having a portion (20) with a taper that engages with the tapering portion (22) of the bush (4,25) to expand the bush (4,25) as the bush (4,25) is squeezed axially between the taper and the socket, and a channel (16) located between said shaft taper and bolt head that extends circumferentially around the shaft and which opposes the channel (12) of the bush (4,25); and
   (iii) the ring clip (6) being seated between the bolt (2) and the bush (4,25) and engaged with both channels (12,16) to retain the bush (4,25) on the bolt (2), said bush channel permitting axial freedom for the ring slip to move therein when seated in the shaft channel.

2. An expanding bush assembly (1) as claimed in claim 1, in which the channel (16) of the bolt (2) extends around a continuous circumference of the shaft (18,20,23).

3. An expanding bush assembly (1) as claimed in claim 1 or claim 2, in which the shaft (18,20,23) has on one side of the tapering portion (20) a first generally cylindrical portion (18) proximate the head (8) and on the other side of the tapering portion (20) a second generally cylindrical portion (23) proximate the threaded portion (10), the channel (16) of the bolt (2) being provided in one of the first (18) and second (23) portions.

4. An expanding bush assembly (1) as claimed in claim 1, in which the channel (12) of the bush (4,25) is wider than the channel (16) of the bolt (2).

5. An expanding bush assembly (1) as claimed in claim 1, in which the inner surface of the bush (4,25) conforms to the bolt (2).

6. An expanding bush assembly (1) as claimed in claim 1, in which the bush (4,25) extends from near the head (8) at least as far as part of the threaded portion (10).

7. An expanding bush assembly (1) as claimed in claim 1, in which the clip (6) is a wire with a circular shape extending substantially fully around the arc of the circle.

8. An expanding bush assembly (1) as claimed in claim 1, in which the clip (6) is spring biased outwardly into the channel (12) of the bush (4,25).

9. An expanding bush assembly (1) as claimed in claim 1, in which the channel (12) of the bush (4,25) has a ramped wall (24) on the side of said channel (12) furthest from the tapering portion (22) of the bush (4,25).

10. An expanding bush assembly (1) as claimed in claim 1, in which the channel (12) of the bush (4,25) has an essentially square section wall on the side of said channel (12) nearest the tapering portion (22) of the bush (4,25).

11. An expanding bush assembly (1) as claimed in claim 1, in which the bush (4,25) is biased to press the clip (6) into engagement with the channel (16) of the bolt (2).

12. An expanding bush assembly (1) as claimed in claim 1, in which the bush is of unitary construction and the expansion split is a slot (7) in the bush (4).

13. An expanding bush assembly (1) as claimed in claim 1, in which the bush (25) is split longitudinally into two or more portions spring biased together by spring biasing means (29), the expansion split being seams (27) between said portions.

* * * * *